(No Model.)
P. STOSKOPF.
COMBINED THILL SUPPORT AND ANTIRATTLER.
No. 558,323. Patented Apr. 14, 1896.
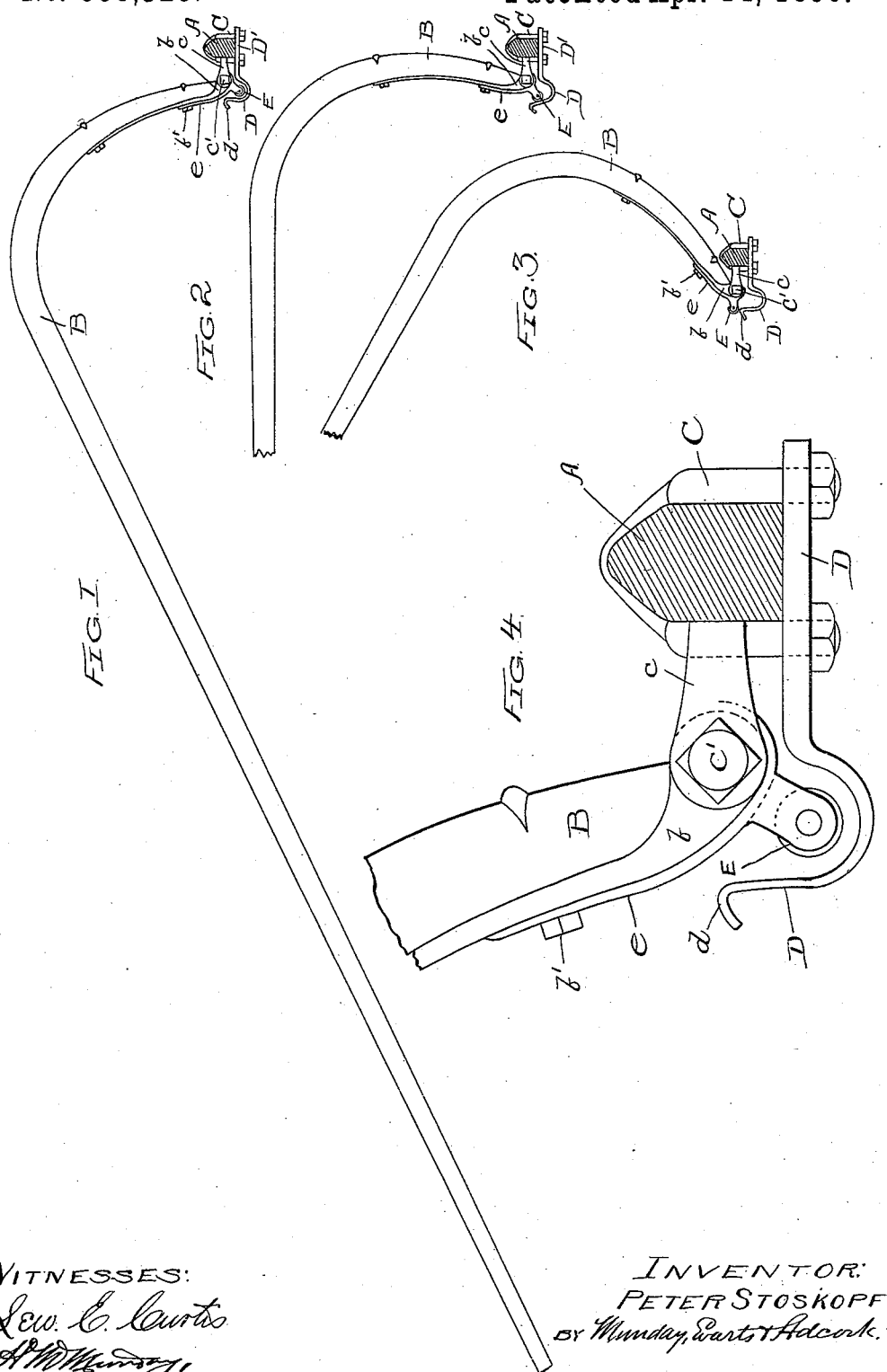
WITNESSES:
Lew. E. Curtis
INVENTOR:
PETER STOSKOPF
BY Munday, Evarts & Adcock.
HIS ATTORNEYS.

UNITED STATES PATENT OFFICE.

PETER STOSKOPF, OF CHICAGO, ILLINOIS.

COMBINED THILL-SUPPORT AND ANTIRATTLER.

SPECIFICATION forming part of Letters Patent No. 558,323, dated April 14, 1896.

Application filed October 18, 1895. Serial No. 566,037. (No model.)

*To all whom it may concern:*

Be it known that I, PETER STOSKOPF, a citizen of the United States, residing in Chicago, in the county of Cook and State of Illinois, have invented a new and useful Improvement in Thill-Support and Antirattler Device for Vehicle-Thills, of which the following is a specification.

This invention relates to an improved thill-support and antirattler device for vehicle-thills.

The nature of the invention will be understood from the subjoined description and claims, and the accompanying drawings, in which—

Figures 1, 2, and 3 are views of the device shown in different positions, Fig. 1 showing the thills resting on the ground, Fig. 2 showing the thills when hitched to the horse and in position to draw the vehicle, and Fig. 3 showing the thills unhitched, elevated, and supported in an elevated position. Fig. 4 is a view of a portion of Fig. 1 enlarged for convenience.

In said drawings, A represents the axle of the vehicle, B is one of the shafts or thills, and C is one of the thill-clips secured to the axle and having two projecting arms $c$ of the ordinary construction to receive the hinge-iron $b$, connected to the thill and pivoted to the arms $c$ by the bolt $c'$ in the ordinary manner.

The parts thus far described do not differ from any of the ordinary thill-clips and hinged connections largely in use at the present time.

D is a curved spring, which is secured to the axle by the thill-clip, and may preferably be so secured by forming at its rear end the plate-piece $D'$ for said clip. The extreme outer end of the spring, as at $d$, is preferably recurved to form a thill-support, as presently described. Attached to the thill-iron $b$ or to a separate iron $e$, which may be held to the thill-iron by one of the bolts $b'$ to secure the thill-iron to the thill, is a roller E, extending into the curved hollow of the spring D in the manner indicated in the drawings. The supplemental iron $e$, to which the roller is connected, as shown in the drawings, has its rear end curved or turned to engage the rear end of the thill-iron to which it is applied, so that this roller-iron may be held securely in its place by the single bolt. The use of the additional or supplemental iron $e$, to which the roller is attached in preference to attaching said roller to the thill-iron itself, is to enable me to apply this device readily to vehicles already constructed without it. It will be seen that the added parts of the device over and above the ordinary structure consist simply of the curved spring and the roller, and that these parts as shown in the drawings are so contrived that they may be readily applied to any ordinary vehicle, as such vehicles are now usually constructed.

When applied in the manner indicated in the drawings, the roller, when the front end of the thills are resting on the ground, does not or need not touch the spring at all, as indicated in Figs. 1 and 4; but when the thills are raised to the hitching height and attached to the horse said roller, forming the short arm of a bell-crank lever of which lever the thills are the long arm, is brought into bearing contact against the outer curve of the spring, deflecting the same slightly, as indicated in Fig. 2, and said roller riding thus against the spring in the motion of the horse forms a most effective, durable, and smoothly-working antirattler device, holding all the slack and wear of the thill-joint; and when the horse is unhitched and the vehicle run into the barn, for example, the thills may be elevated into the position indicated at Fig. 3, when the roller will ride out of its bearing against the spring, and the latter springing back by its own resiliency will form a rest at its recurved portion for said roller, forming a most effective thill-support, which will not interfere with the subsequent lowering of the thills, as the application of sufficient force to said thills will cause the roller to ride back over the recurved end of the spring into its position or positions.

The whole device constitutes an easily-operated and very durable combined thill-support and antirattler, which requires no manipulation whatever beyond the ordinary raising and lowering of the thills as they are brought into and out of use. The presence of the roller as the contact medium between the thill-iron and the spring not only increases the ease with which the device is operated, but also prevents wear on the spring, the surface of which is liable at any time, of course, to be covered with grit and dirt.

The device may be applied by the manufacturer when the vehicle is constructed, or may be subsequently added without trouble to any ordinary vehicle as the same are now constructed.

I claim—

1. The combined thill-support and antirattler, consisting of the roller carried on a short arm extending downward from the rear end of the thill, in combination with the spring extending outward and upward from the axle, the roller being so placed with relation to said spring that when the thills are raised to the hitching height it will bear against and deflect the spring, and when the thills are elevated said roller will rest on the outer end of said spring, substantially as specified.

2. The combination with the roller E of the supplemental iron $e$, adapting it to be attached to the ordinary thill-iron by a single bolt, and the curved spring having a rearward extension adapted to form a clip-plate, in conjunction with the thill, the thill-iron and the thill-clip, substantially as specified.

3. The combination of the roller E connected to the thill-iron and the curved spring D connected to the clip, and having its outer end recurved to form a support for the roller when the thills are elevated, substantially as specified.

PETER STOSKOPF.

Witnesses:
H. M. MUNDAY,
EDW. S. EVARTS.